United States Patent Office 3,331,151
Patented July 18, 1967

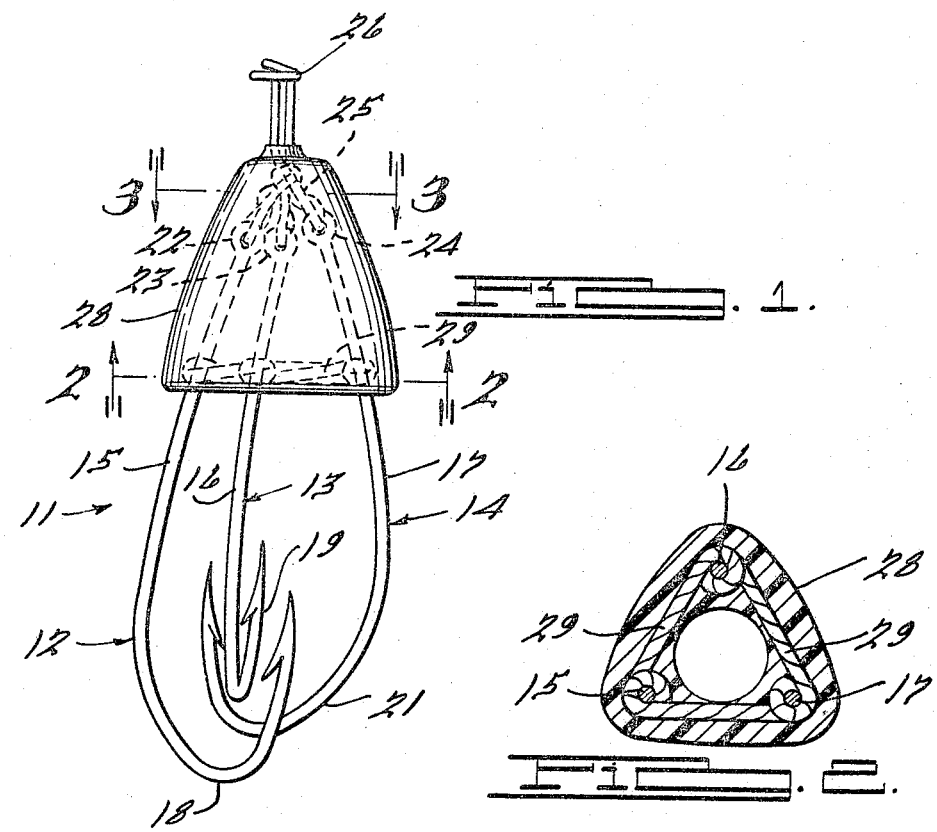
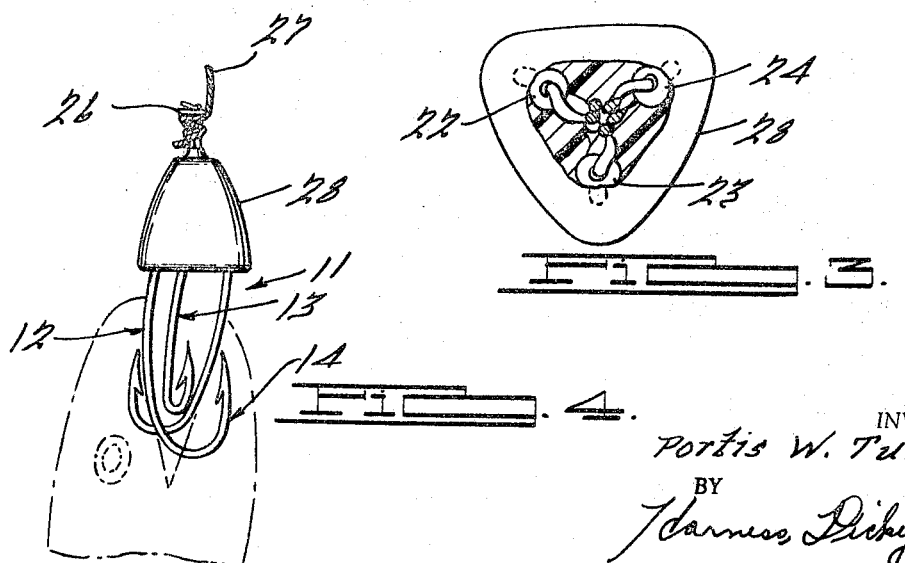

3,331,151
MULTIPLE HOOK ASSEMBLY
Portis W. Turrentine, 34 Augusta Ave.,
Pontiac, Mich. 48053
Filed Feb. 8, 1965, Ser. No. 430,799
2 Claims. (Cl. 43—43.2)

ABSTRACT OF THE DISCLOSURE

A plurality of fish hooks independently and pivotally supported with their shanks extending at an acute angle to and their barbed ends extending inwardly toward a common longitudinal axis to provide a protective cluster and a resilient body covering a portion of the shanks to yieldingly resist inward pivotal movement of the fish hooks.

This invention relates to multiple or gang type fish hooks and more particularly to improved weedless types of multiple fish hooks.

It has been proposed to provide a multiple or gang type fish hook wherein a plurality of individual hooks are supported with their barbed ends facing inwardly rather than outwardly as in the conventional type of fish hook. The barbed ends of the individual hooks are thus shielded by the shank ends of the other hooks so that they will not become easily snagged upon weeds and will be more easy to handle without the danger of impaling one's fingers upon the barbs of the hook. The individual hooks are supported for movement so that they may pivot to expose the barbed ends when a game fish strikes the hook.

The hooks of the aforementioned type that heretofore have been proposed have either been provided with resilient shank ends for the individual hooks or have provided individual springs that bias the hooks to their retracted position. These types of hooks have not proven satisfactory, however. The hooks with the resilient shanks are prone to breakage under the forces exerted by large game fish and the type of hook employing separate springs are too costly.

It is, therefore, a principal object of this invention to provide an improved low cost anti-fouling multiple or gang type fish hook.

It is a further object of this invention to provide an inexpensive fish hook of the aforementioned type.

The pivotal movement of the individual hooks of the aforementioned type of hook assembly also has had another disadvantage. The pivotal movement of the individual hooks, when struck by a game fish, frequently results in interference between the hooks. The interference between the individual hooks has precluded the barbed ends of the hooks from presenting themselves to the fish. As a result, it has been difficult, if not impossible, to hook the fish.

It, therefore, is a further object of this invention to provide a weedless gang hook assembly that reduces the likelihood of fouling when struck by a fish.

A multiple fish hook assembly embodying this invention comprises a plurality of individual hooks having shank and barbed ends. The hooks are supported with their shank ends extending at an acute angle to a common longitudinal axis and with the barbed ends of the individual hooks extending inwardly toward the longitudinal axis whereby the barbed end of an individual hook normally is protected by at least one shank of another hook. Means pivotally connect the shank ends of the hooks for movement inwardly toward the longitudinal axis to expose the barbed ends. A body of resilient plastic-like material is interposed between the shank ends of the hooks contiguous to their pivotal connection to yieldably resist inward pivotal movement.

As a further feature of this invention, the barbed ends of the individual hooks may be positioned at different distances along the longitudinal axis to minimize fouling of the hooks upon pivotal movement thereof. Fouling also may be minimized by employing different shapes for each of the barbed ends.

Further objects and advantages of this invention will become more apparent as this description proceeds, particularly when considered in conjunction with the accompanying drawings, wherein;

FIGURE 1 is a side elevational view of a multiple fish hook assembly ambodying this invention;

FIGURE 2 is a cross-sectional view taken substantially along the line 2—2 of FIGURE 1;

FIGURE 3 is a cross-sectional view taken substantially along the line 3—3 of FIGURE 1; and FIGURE 4 is a side elevational view, in part similar to FIGURE 1, showing the hook assembly as it appears when it is struck by a game fish.

Referring now in detail to the drawings, a multiple fish hook assembly embodying this invention is identified generally by the reference numeral 11. The hook assembly 11 includes individual hooks, 12, 13 and 14 having shank ends 15, 16 and 17, respectively. The shank ends 15, 16 and 17 terminate in barbed hook ends 18, 19 and 21, respectively. It will be noted that the shank ends 15, 16 and 17 are disposed at an acute angle to a common longitudinal axis that extends between the individual hooks. The barbed ends 18, 19 and 21 face inwardly toward this longitudinal axis. It will be further noted that the barbed ends 18, 19 and 21 are spaced different longitudinal distances along the longitudinal axis and have slightly different shapes. This is emphasized in FIGURE 4.

The shank ends 15, 16 and 17 terminate in eyes 22, 23 and 24, respectively, opposite to the barbed ends 18, 19 and 21. An inter-connecting wire assembly 25 pivotally connects each of the individual hooks 12, 13 and 14 with respect to the others, although other types of pivotal connections may be used. The wire assembly 25 terminates in a leader attaching portion 26 so that the hook assembly 11 may be attached to a fish line 27 or artificial lure. The upper portions of the shank ends 15, 16 and 17 are embedded in a generally conical shaped body of resilient plastic-like material 28. The resilient body 28 extends around the pivotal connection between the individual hooks. The resilient body 28 holds the individual hooks 12, 13 and 14 at their spaced acute angle positions relative to the longitudinal axis and yieldably resists inward movement of the individual hooks. A strand of string, wire, or some other similar substantially extensible element 29 extends around the shank ends 15, 16 and 17 and is embedded within the body 28. The element 29 will limit the outward pivotal movement of the individual hooks 12, 13 and 14.

It should be readily apparent that the action of the resilient body 28 will normally hold the individual hooks 12, 13 and 14 in the position shown in FIGURE 1 so that the hook assembly 11 may be handled without impaling one's finger's upon the barbed ends 18, 19 and 21. In addition, the hook assembly 11 may be passed through obstructions in the water such as weeds and other vegetation without it becoming entwined on the hook assembly 11. When the jaws of a game fish (FIGURE 4) engage the shank ends 15, 16 and 17 of the hook assembly 11, the resilience of the body 28 will be overcome. The individual hooks 12, 13 and 14 then may pivot inwardly toward the longitudinal axis to expose their barbed ends 18, 19 and 21. The different lengths and shapes of the barbed ends reduces fouling during this pivotal movement. The hook may then be set in the fish's mouth by exerting a pressure upon the hook by jerking the fish line 27 that is attached to the hook assembly 11.

It should be readily apparent that the disclosed assembly permits the construction of a weedless hook without the use of complicated spring assemblies or without requiring hooks having resilient shanks. The structure also lends itself to low cost, high volume production.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A multiple hook assembly comprising three individual hooks having shank and barbed ends, said hooks being supported with their shank ends extending at an acute angle to a common longitudinal axis and with the barbed ends of individual hooks extending inwardly toward said longitudinal axis whereby the barbed end of an individual hook normally will be protected by at least one shank end of another hook, means pivotally connecting the shank ends of said hooks for movement inwardly toward said longitudinal axis to expose said barbed ends, the barbed ends of each of said hooks terminating at different longitudinal locations relative to said longitudinal axis and having different shapes to minimize the fouling of said hooks upon pivotal movement thereof, a portion of the shank ends of each of said hooks being embedded in a body of resilient plastic-like material contiguous to their pivotal connection for yieldably resisting inward pivotal movement of said hooks, and a flexible substantially inextensible element embedded in said body and interconnecting adjacent pairs of said hooks for limiting the outward pivotal movement thereof without hindering inward pivotal movement.

2. A multiple hook assembly comprising a plurality of individual hooks having shank and barbed ends, the barbed ends of each of said hooks comprising a curved portion extending from the lower termination of the respective shank and terminating in a pointed end adjacent a barb, said hooks being supported with their shank ends extending at an acute angle to a common longitudinal axis and with the barbed ends of the individual hooks extending inwardly toward said longitudinal axis whereby the barbed end of an individual hook normally will be protected by at least one shank end of another hook, means pivotally connecting the shank ends of said hooks for movement inwardly toward said longitudinal axis to expose said barbed ends, the lower termination of the curved portion of at least two of said barbed ends being disposed at different longitudinal locations relative to said longitudinal axis to minimize fouling of said hooks upon pivotal movement thereof, the pointed end of each of said two hooks terminating at a point disposed above the curved end of the other of said two hooks for minimizing the overall length of said multiple hook assembly, and a portion of the shank ends of said hooks being embedded in a body of resilient plastic-like material contiguous to their pivotal connection for yieldably resisting inward pivotal movement of said hooks.

References Cited

UNITED STATES PATENTS

| | | | |
|---|---|---|---|
| 454,580 | 6/1891 | Mack | 43—43.2 |
| 699,711 | 5/1902 | Pyott | 43—42.4 X |
| 2,124,263 | 7/1938 | Schott | 43—43.2 |
| 2,854,779 | 10/1958 | Jackson | 43—42.1 X |

FOREIGN PATENTS

| | | |
|---|---|---|
| 511,719 | 4/1955 | Canada. |

SAMUEL KOREN, *Primary Examiner.*

WARNER H. CAMP, *Examiner.*